(12) United States Patent
De Lessio

(10) Patent No.: US 9,511,463 B1
(45) Date of Patent: Dec. 6, 2016

(54) PORTABLE LATHE JIG

(71) Applicant: Joseph De Lessio, The Villages, FL (US)

(72) Inventor: Joseph De Lessio, The Villages, FL (US)

(*) Notice: Subject to any disclaimer, the term of this patent is extended or adjusted under 35 U.S.C. 154(b) by 0 days.

(21) Appl. No.: 14/998,449

(22) Filed: Jan. 5, 2016

(51) Int. Cl.
| | |
|---|---|
| *B23Q 3/00* | (2006.01) |
| *B23Q 9/00* | (2006.01) |
| *B23B 25/00* | (2006.01) |
| *B25H 1/00* | (2006.01) |
| *B23Q 3/04* | (2006.01) |

(52) U.S. Cl.
CPC ............. B23Q 9/0078 (2013.01); B23B 25/00 (2013.01); B25H 1/005 (2013.01)

(58) Field of Classification Search
CPC ............... B23Q 3/04; B23Q 3/02; B25H 1/00; B25H 1/0035; B25H 1/02; B25H 1/16; B25H 1/18; B23B 47/28; B23C 7/02
See application file for complete search history.

(56) References Cited

U.S. PATENT DOCUMENTS

| | | | | | |
|---|---|---|---|---|---|
| 2,520,607 | A | * | 8/1950 | Meany | B23C 7/00 409/240 |
| 2,847,883 | A | * | 8/1958 | Bagby | B23B 47/28 408/105 |
| 2,928,441 | A | * | 3/1960 | Farrow | B23B 47/288 144/253.1 |
| 3,188,076 | A | * | 6/1965 | Pryor | B23Q 3/06 269/101 |
| 4,275,777 | A | * | 6/1981 | Briggs | B23D 59/00 144/1.1 |
| 5,890,521 | A | * | 4/1999 | Dunn | B24B 27/0076 144/1.1 |
| 6,393,712 | B1 | * | 5/2002 | Jansson | B24B 41/066 33/628 |
| 7,094,012 | B1 | * | 8/2006 | Bang | B23Q 3/04 108/6 |
| 2014/0369739 | A1 | * | 12/2014 | Bukovitz | B25G 1/06 403/66 |
| 2015/0174756 | A1 | * | 6/2015 | Firth | B25H 1/04 83/477 |

* cited by examiner

Primary Examiner — Will Fridie, Jr.
(74) Attorney, Agent, or Firm — Frank B. Arenas, Esq.

(57) ABSTRACT

An article of manufacture, a portable lathe jig device for use with a lathe and hand tools, such as router is disclosed, with a top U-shaped unit with fences and stop plates slidably engaged to a bottom U-shaped unit and the units are movable or locked together with knobs with threaded tightening bolts.

20 Claims, 18 Drawing Sheets

PORTABLE LATHE JIG

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

Field of the Invention

Versions and embodiments of the present invention relate generally to lathes and accessory equipment. Particularly, embodiments of the invention relate to lathes jigs for hand tools and uses thereof. Specifically but not intended to be limiting, versions of the invention relate to permanent and portable jigs to allow precise manual router and other hand tool integration with lathes and new, useful and unobvious versions thereof.

Description/Background of the Related Art

The art discussed herein is not to be considered admitted prior art but is presented to more clearly discuss and describe what is still lacking in the earlier art.

A lathe is a machine tool which rotates the workpiece on its axis to perform various operations such as cutting, sanding, knurling, drilling, or deformation, facing, turning, with tools that are applied to the workpiece to create an object which has symmetry about an axis of rotation. Lathes are used in woodturning, metalworking, plastics and with all other suitable materials. A lathe may or may not have legs which sit on the floor and elevate the lathe bed to a working height. A lathe may be small and sit on a workbench or table, and not require a stand.

Almost all lathes have a bed, which is (almost always) a horizontal beam (although CNC lathes commonly have an inclined or vertical beam for a bed to ensure that swarf, or chips, falls free of the bed). Woodturning lathes specialized for turning large bowls often have no bed or tail stock, merely a free-standing headstock and a cantilevered tool rest.

In metalworking and woodworking, a jig is a type of custom-made tool used to control the location and/or motion of another tool, such as a hand router. A jig's primary purpose is to provide repeatability, accuracy, and interchangeability in the manufacturing of products. Problems in the art are non-precise control of a hand router, for example, wasted time and lack of precision for repeatable details, increasing manufacturing labor and associated costs, and free-hand applied designs which may cause injuries.

Versions of this new and useful portable lathe jig allow repeatable and precise details into lathe workpieces parallel, angled and perpendicular to the lathe's rotational axis. One problem versions of this device solve is the ability of using a hand router (or other hand tool) on a workpiece in a precise repeatable pattern for aesthetic beauty and labor time savings for producing multiple copies of a product, like a wooden, plastic or metal bowl, for example, versus a cantilevered tool rest or free-hand of the old art. When the workpiece is finished on the spinning lathe, it is desired by artisans to created designs on. the stationary workpiece with hand tools. This device is far superior for creating designs with hand tools versus freehand tools.

No portable lathe jig device and/or system is known to this inventor that addresses these deficiencies in the earlier art in conventional lathe jigs. This new, useful and unobvious invention, in various embodiments, accomplishes this much needed advantage of increase in safety, and reduction in manufacturing labor time and costs versus conventional lathe jig devices and/or systems.

SUMMARY OF THE INVENTION

Advantages of versions of the present invention include avoidance of the many problems in the art by using a hollow frame to adjust needed angles in multiple dimensions. The optional releasable attachment of the device to the lathe provides more versatility to the manufacturing process and improves economy.

Benefits, features and problems solved by versions of the invention include: Better safety, as the portable lathe jig keeps the operator's hands and body away from the workpiece; more precision for repeatable effects on the workpiece such as design or functional aspects; time savings by the ability to change hand tool bits and/or attachments and keep the same settings for additional effects on the workpiece, and the ability to effect angled and/or curved designs and/or functional aspects.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
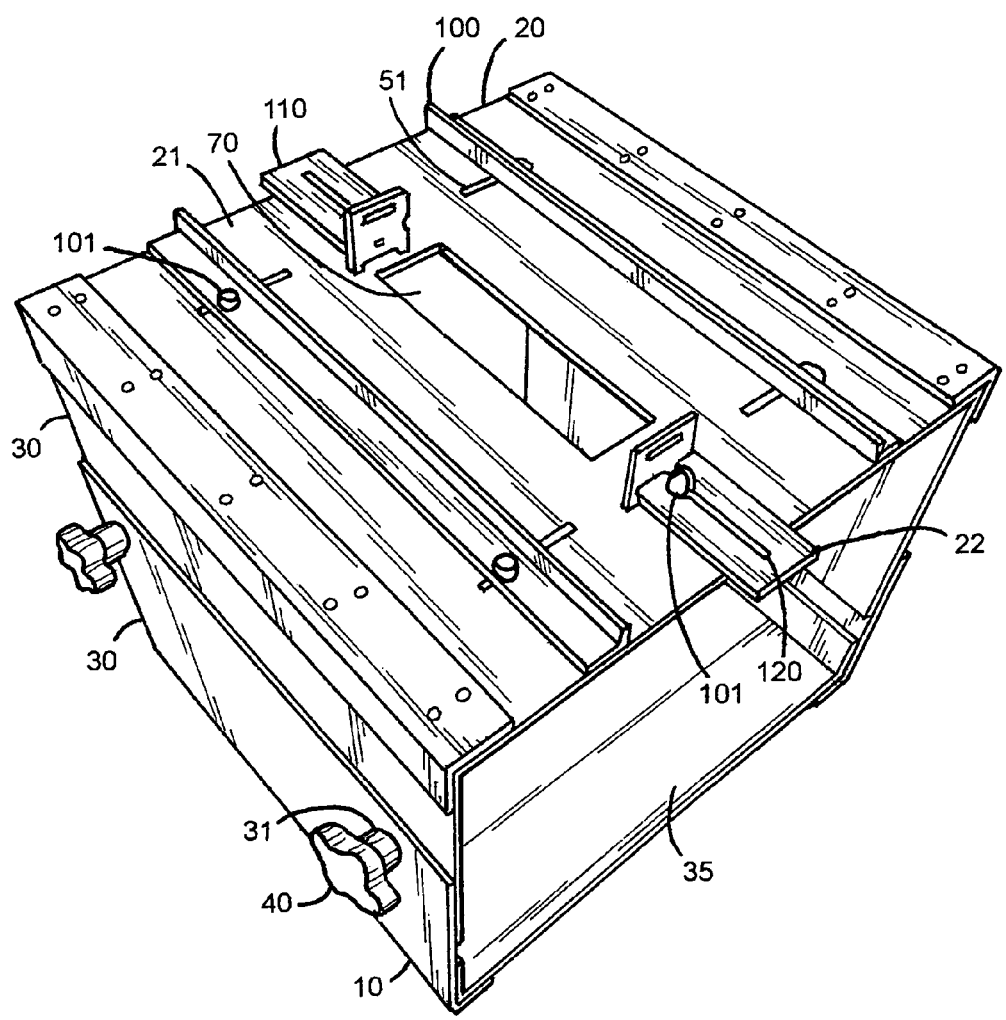
FIG. 1 is a top perspective view of a version of the invention.
Figure 2:
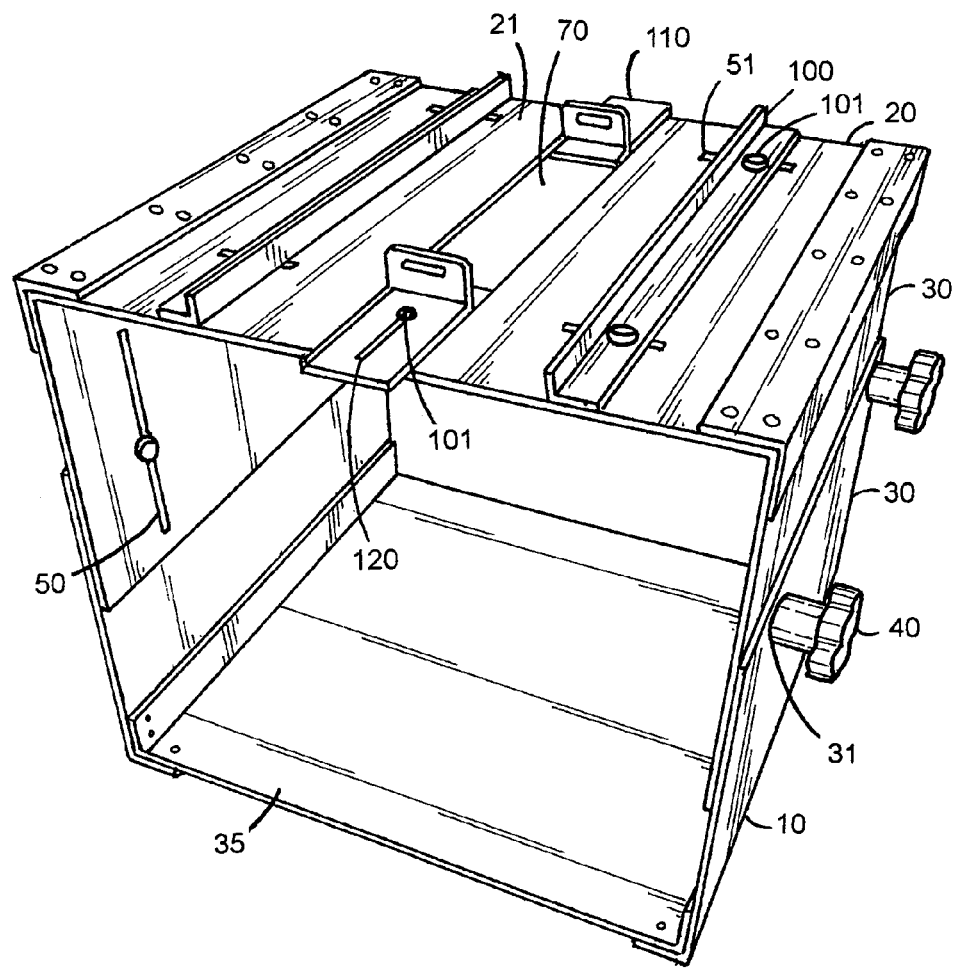
FIG. 2 is a perspective view of a version of the invention.
Figure 3:
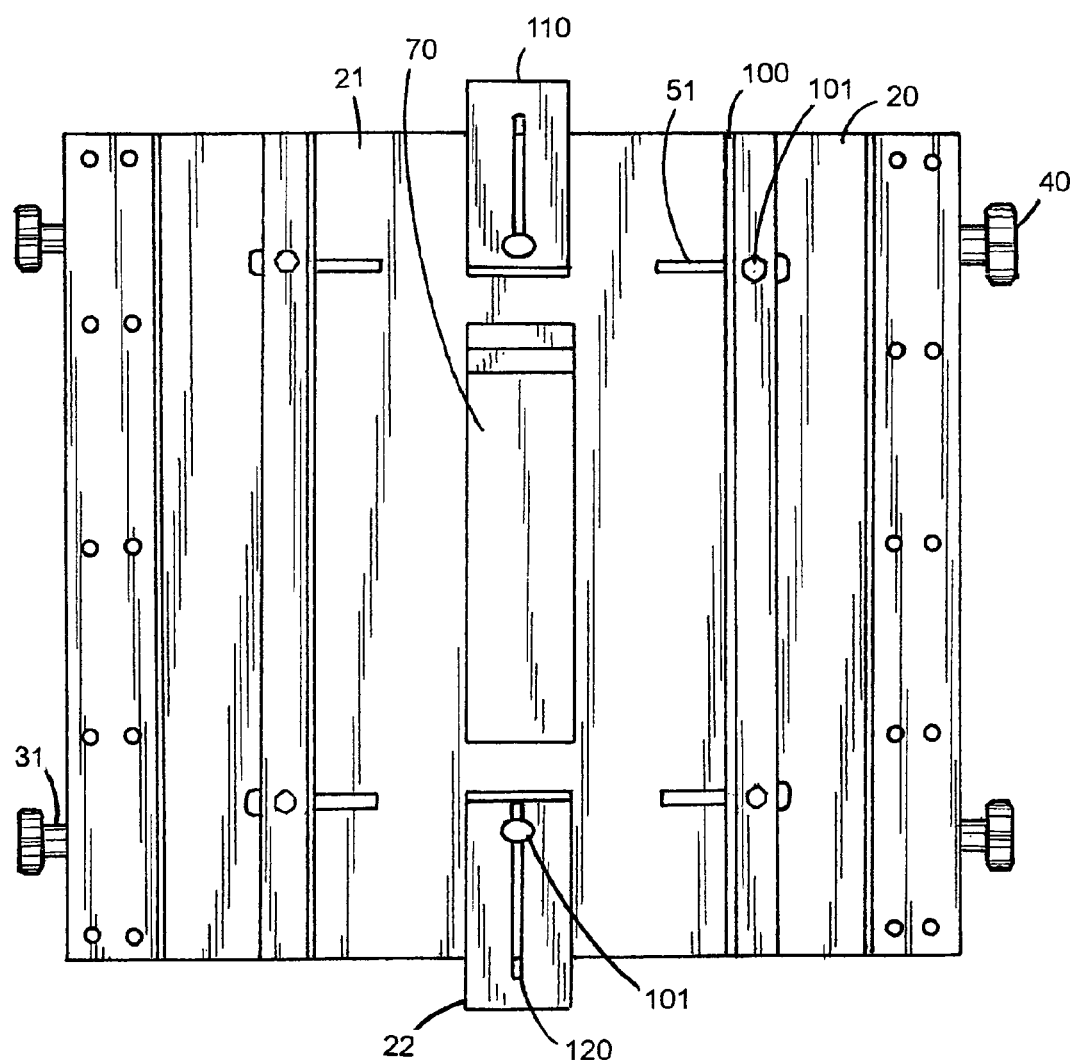
FIG. 3 is a top view of a version of the invention.
Figure 4:
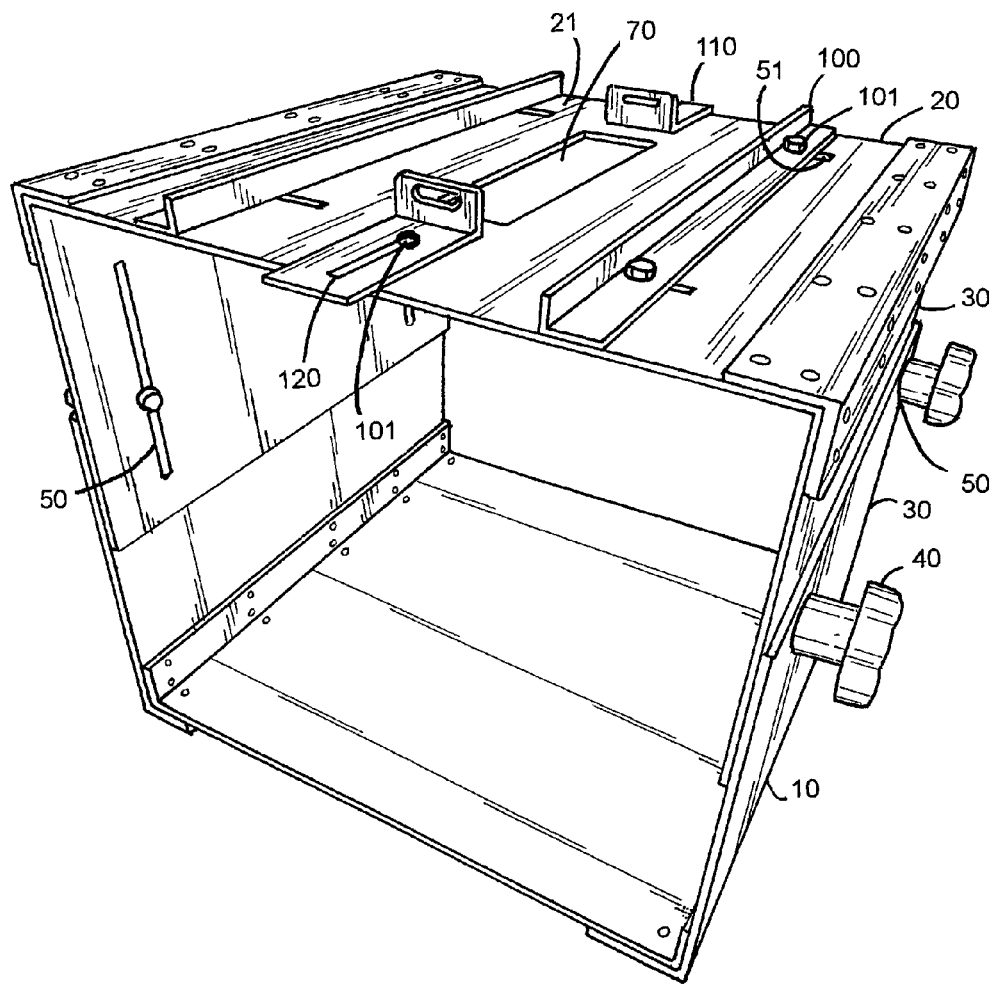
FIG. 4 is a perspective view of a version of the invention.
Figure 5:
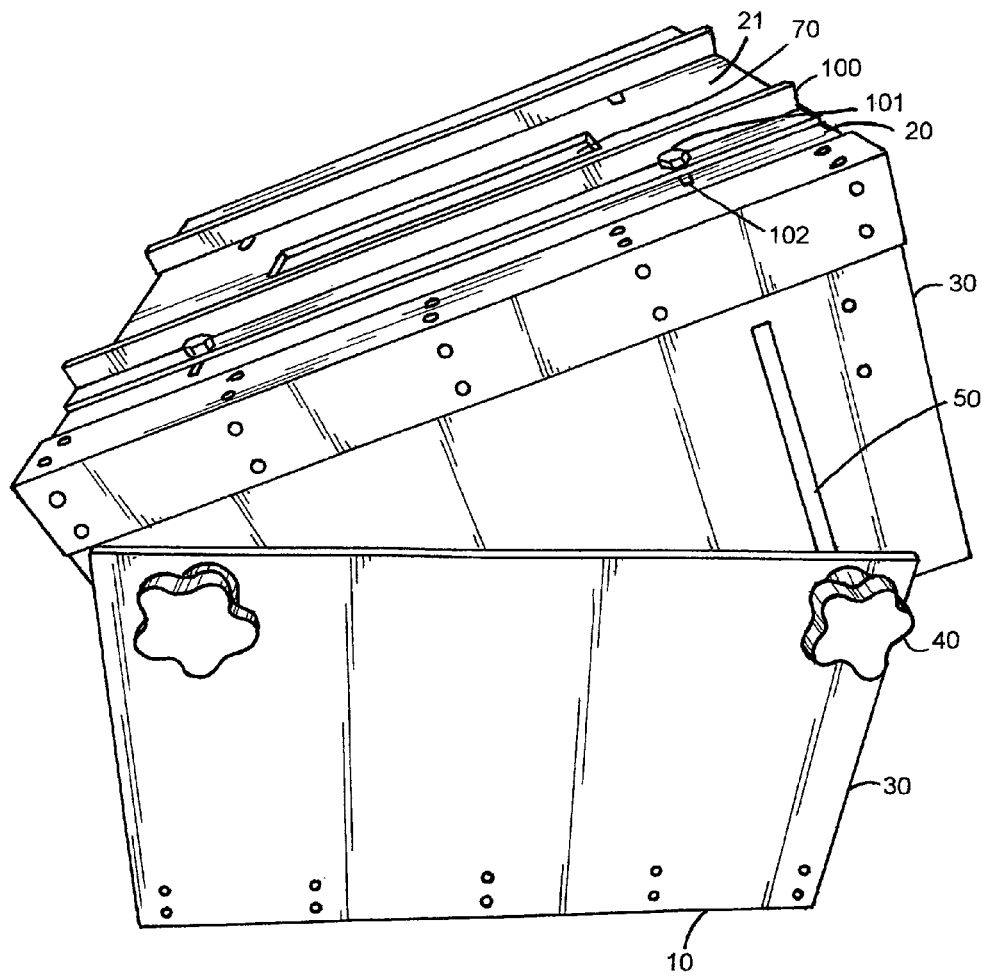
FIG. 5 is a side view of a version of the invention showing angle mode.
Figure 6:
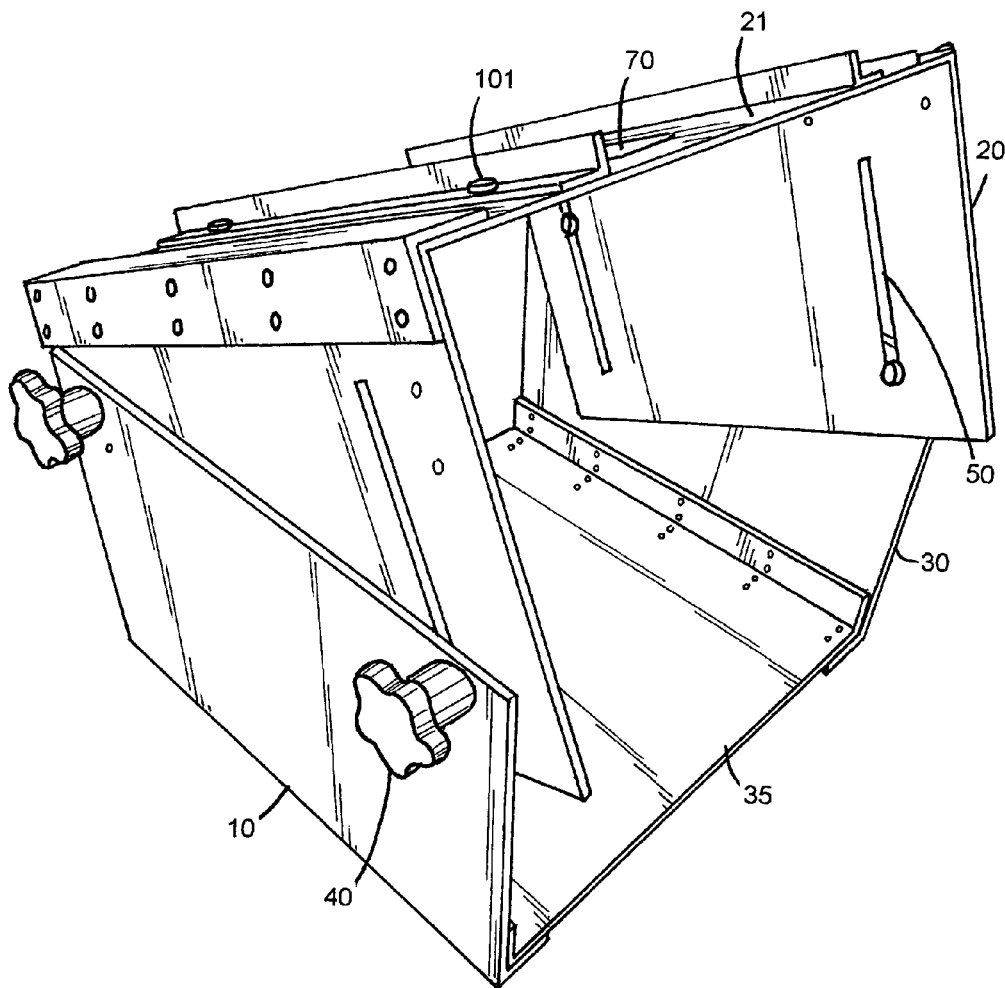
FIG. 6 is a perspective view of a version of the invention showing angle mode.
Figure 7:
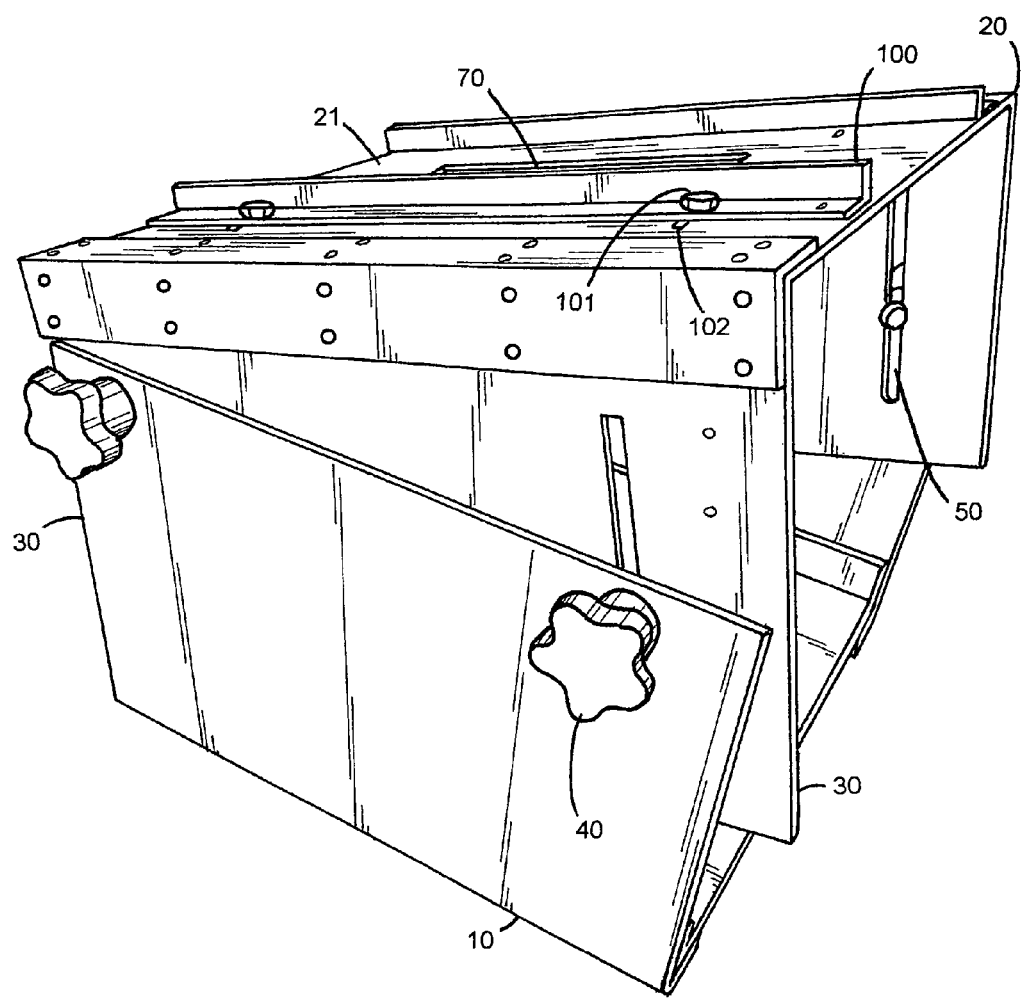
FIG. 7 is a perspective view of a version of the invention showing angle mode.
Figure 8:
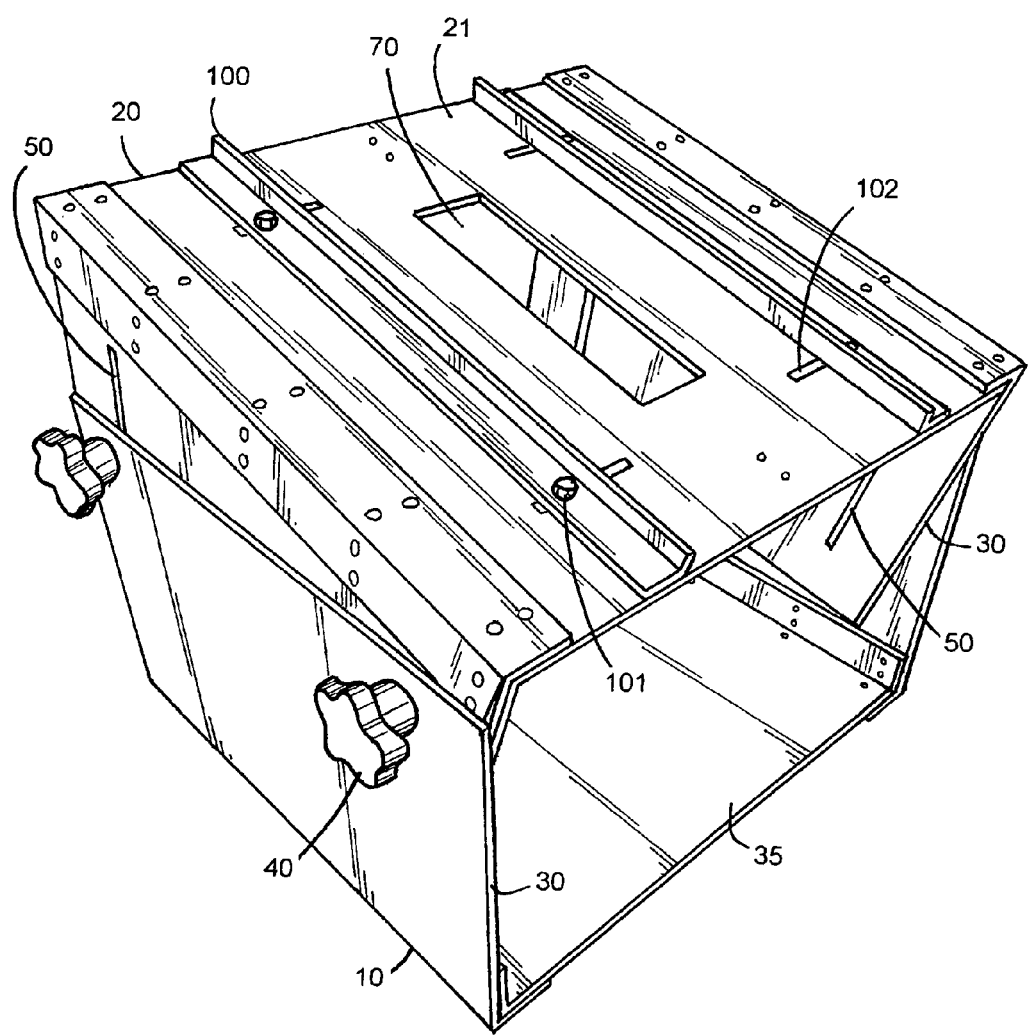
FIG. 8 is a perspective view of a version of the invention showing angle mode.

While the present invention will be described with reference to the details of the embodiments of the invention shown in the drawings (and some embodiments not shown in the drawings), these details are not intended to limit the scope of the invention.

As would be known by one of average skill in the art, such as a wood or metal worker, lathe equipment designer and/or lathe jig equipment manufacturer, modifications may be made that are intended to be within the scope of versions of the invention.

DETAILED DESCRIPTION OF THE PREFERRED EMBODIMENT

It is understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that "or" is an inclusive "or" to include all items in a list and not intended to be limiting and means any combination or permutation of all, one, some, a plurality or none of each of the item or list mentioned. It is also understood that "include (s)" and/or "including" means "including but not limited to" any combination or permutation of all, one, some, a plurality or none of each of the item or list mentioned. It is further understood that the present invention is not limited to the particular methodology, materials, uses and applications described herein, as these may vary. Structures described herein are to be understood also to refer to functional equivalents of such structures. Various modifications, versions and embodiments are within the scope of the present invention.

The attachment of the elements, if desired, may be of any suitable type connector—magnets, clamps, glue, suction cups, fastener, wing nut, screw, bolt, weld, snap, rivet, rod, dowel, hook, plug, connector, and/or any other means, either attached/secured permanently, temporarily and/or releasably attached.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, slideably attached and/or integrated onto each other as desired by the operator and/or manufacturer.

At least one of the basic components is necessary but a plurality may be utilized if desired for different versions of the invention.

This great improvement over the prior art expands greatly the operator's control of the workpiece versus a cantilevered tool rest, improves safety and reduces the operator's errors when used.

Versions of the invention may be made with any and all suitable materials desired as needed for the appropriate use and is not limited by the type of materials that may be used. Versions are all scalable and may be made any suitable size; large, small and/or any size as desired.

To make a version of the invention in a basic embodiment as shown in the drawings, one skilled in the art would proceed as follows (all dimensions are for illustration only and not intended to be limited as to what dimensions may be used as desired by the operator):

The main body (also called frame) of this portable router lathe device is constructed from a sheet of aluminum (or other suitable material), of a desired height, length and thickness, suitable for the intended purpose.

As shown in FIGS. 1, 2, 3 and 4, the bottom unit 10 consists of three pieces of aluminum sheet assembled in a U-shaped configuration with a base plate 35 and two legs 30 of a desired height, length and thickness, suitable for the intended purpose. Each of the legs 30 is attached to the base plate 35 at a 90 degree angle (or other desired angle) with a suitably thick aluminum angle bar of a desired height, length and thickness, suitable for the intended purpose (or could be welded together). The base plate 35 could also be bent up 90 degrees and attached with suitable connectors as shown in the drawings. The angle bar secures the legs 30 to the base plate 35 with aluminum rivets (or other suitable connector 101) along the length of each angle bar side. The bottom unit 10 optionally may be made of one sheet of metal bent by a metal break to make a uni-body U-shaped type structure.

The top unit 20 consists of three pieces of aluminum sheet assembled in a U-shaped configuration with a top plate 21 and two legs 30 of a desired height, length and thickness, suitable for the intended purpose. Each of the legs 30 is attached to the top plate 21 at a 90 degree angle (or other desired angle) with a suitably thick aluminum angle bar of a desired height, length and thickness, suitable for the intended purpose (or could be welded together). The top unit 20 optionally may be made of one sheet of metal bent by a metal break to make a uni-body U-shaped type structure.

The top unit 20 is narrower (or could be wider to operate in the same manner) than the bottom unit 10 to allow it to fit (slidably engaged) into the bottom unit 10 and move up and down freely thereby changing the dimensions of the open ended box that is formed. When the appropriate size and/or configuration is attained, the top unit 20 is secured to the bottom unit 10 by locking the legs 30 of the top unit 20 and bottom unit 10 with knobs with threaded tightening bolts 40 (two on each leg 30, for example) that go through holes 31 drilled in the legs 30 of the bottom unit 10 and matching leg slots 50 in the legs 30 of the top unit 20. The leg slots 50 are suitably wide and long and allow the top unit 20 to be secured to the bottom unit 10 at the desired angle. The knobs with tightening bolts 40 may also be any other suitable connector 101.

Figure 9:
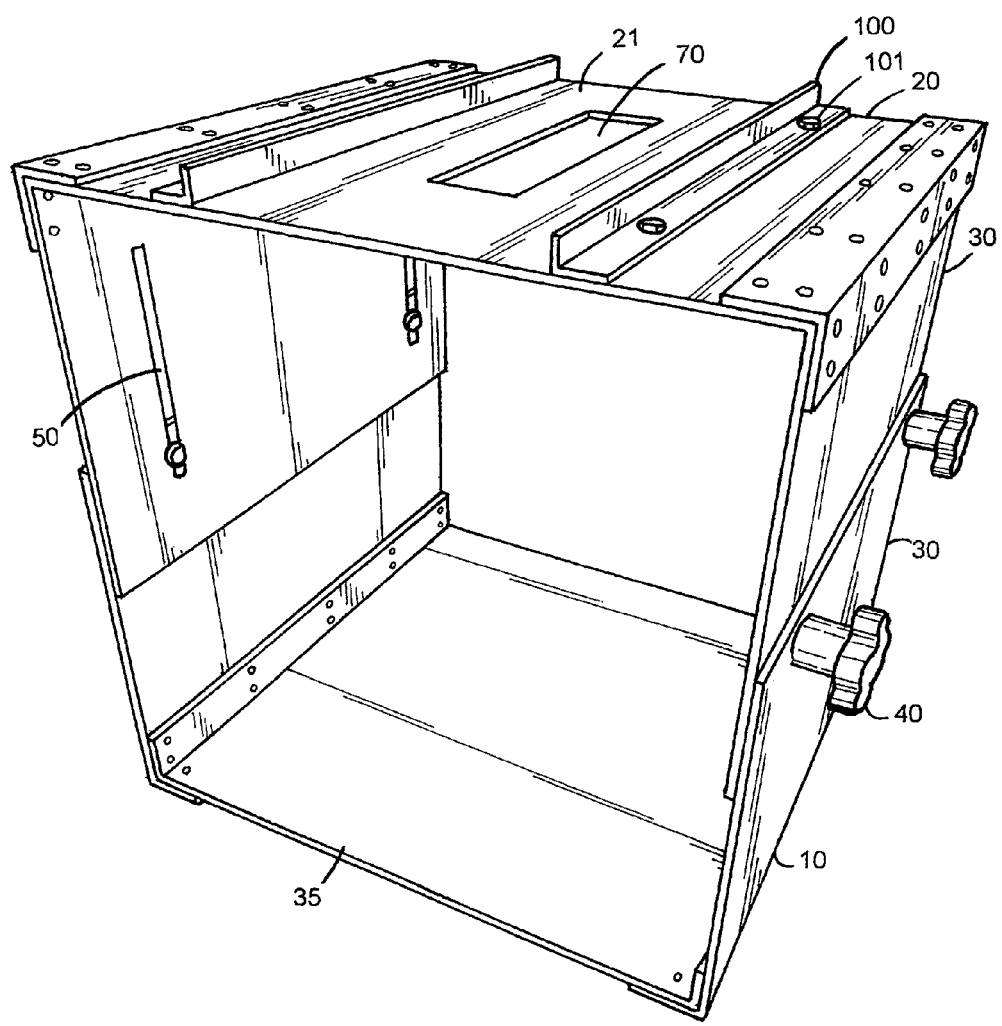
FIG. 9 is a perspective view of a version of the invention showing level height mode.
Figure 10:
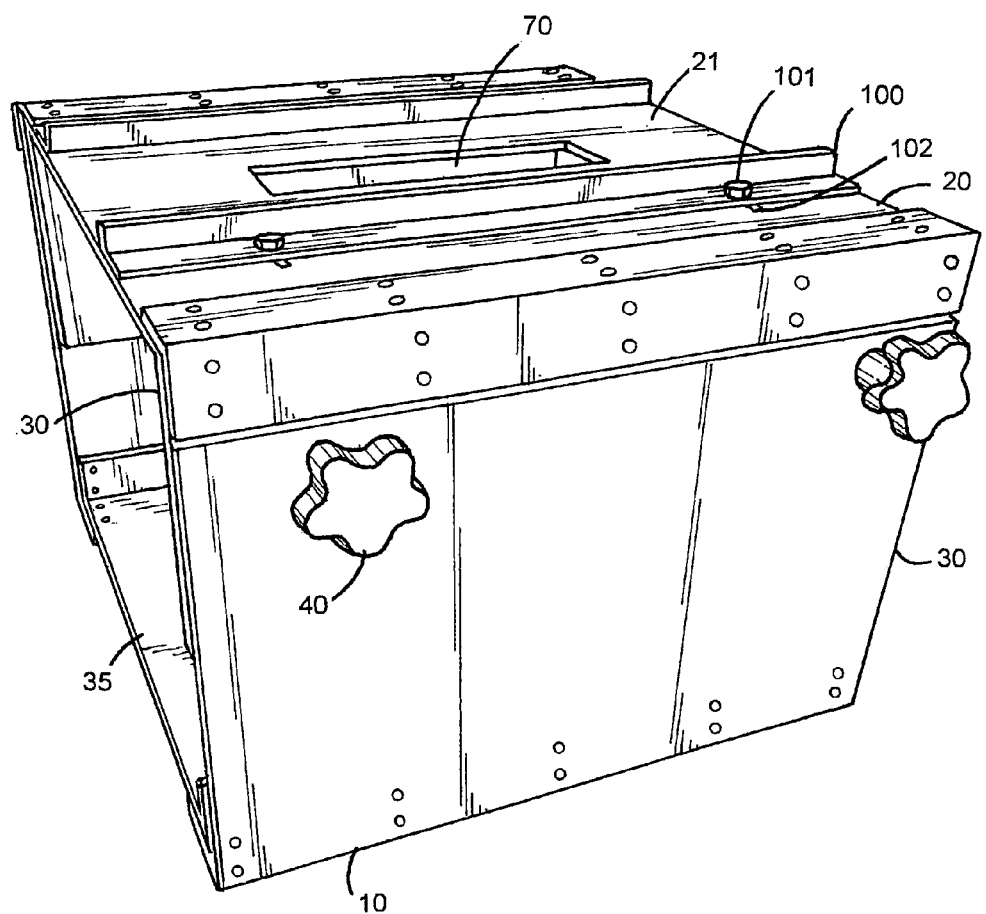
FIG. 10 is a perspective view of a version of the invention showing reduced level height mode.
Figure 11:
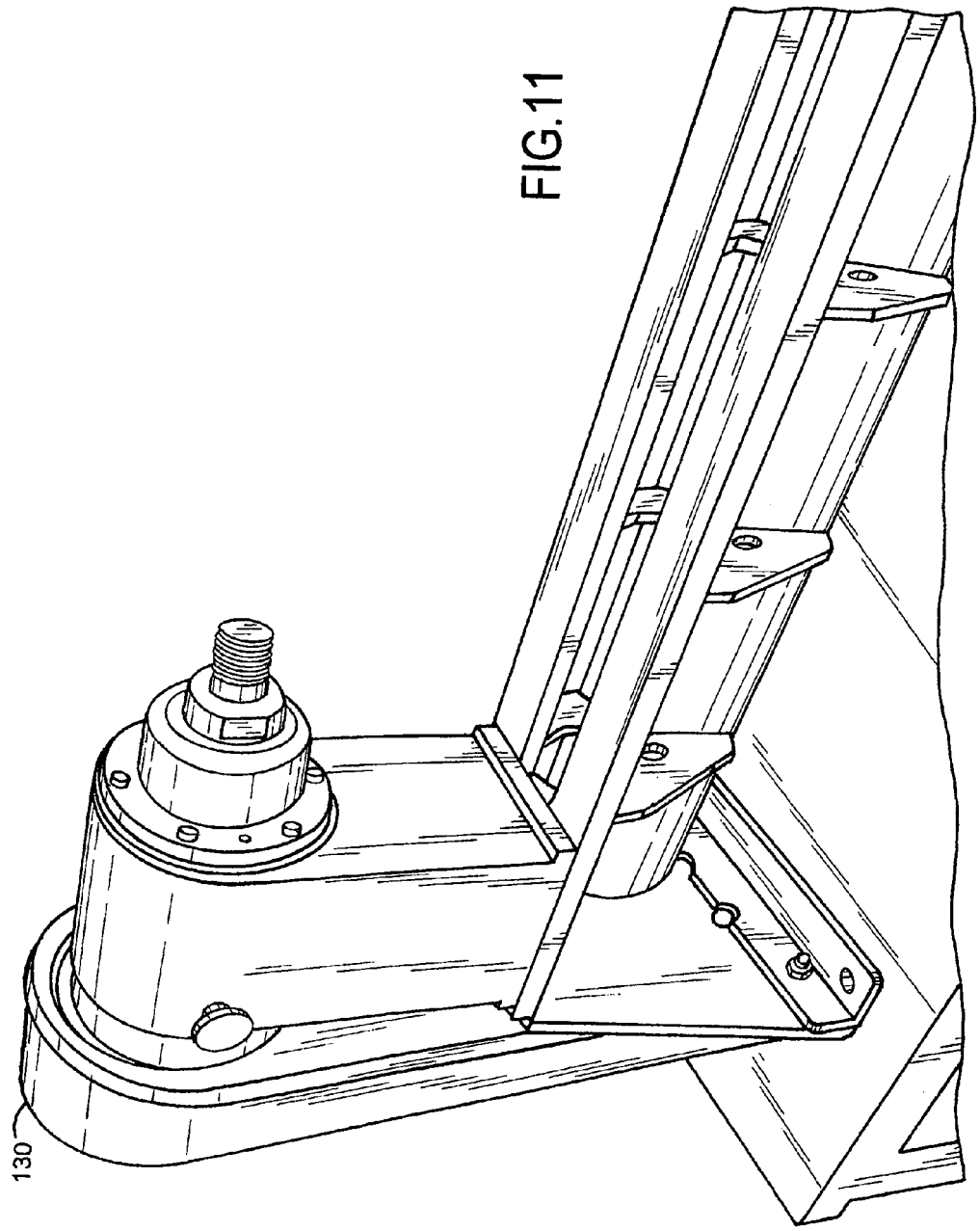
FIG. 11 is a perspective view of a typical bench mounted lathe and headstock.
Figure 12:
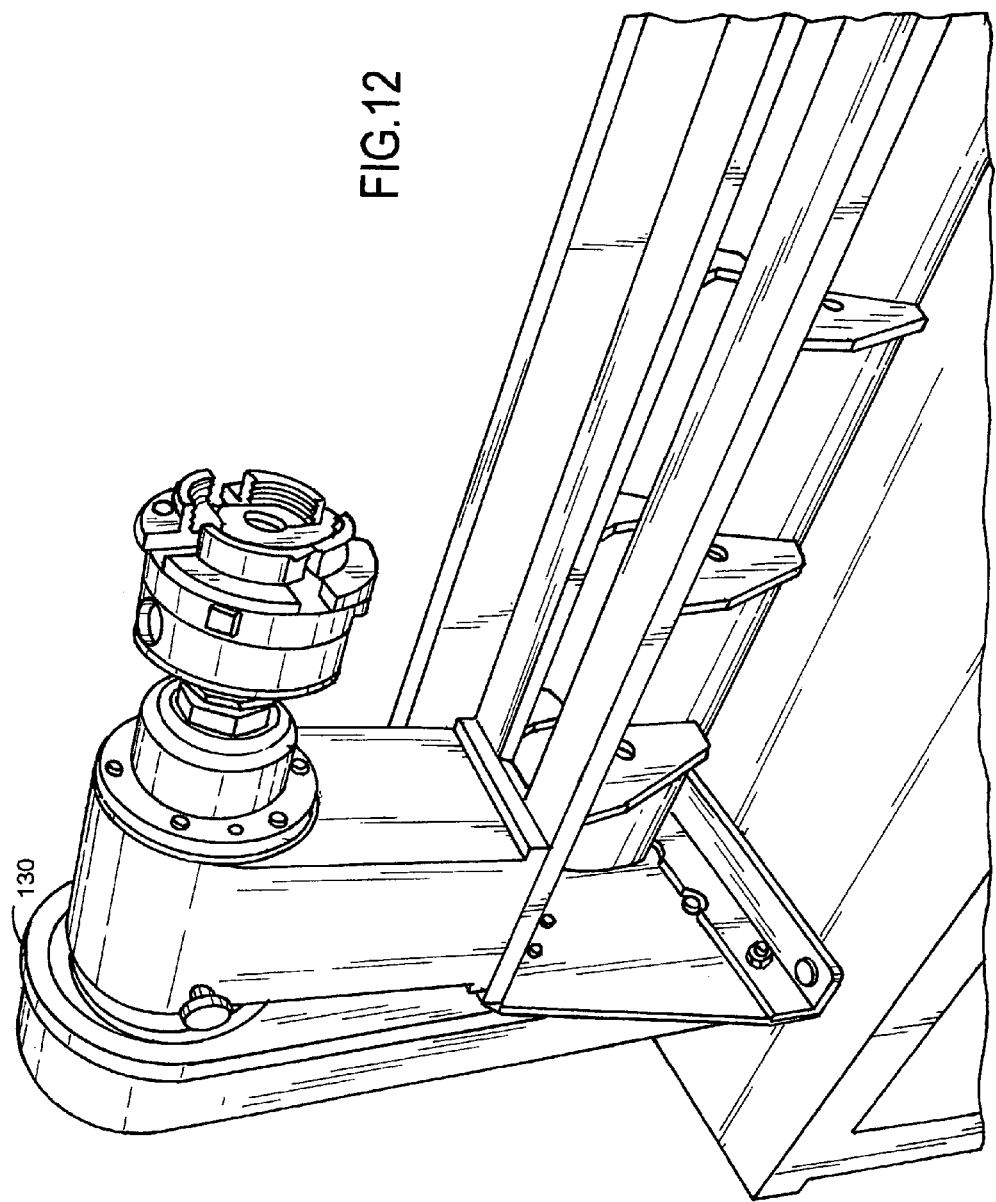
FIG. 12 is a perspective view of a typical bench mounted lathe and headstock with chuck attached.
Figure 13:
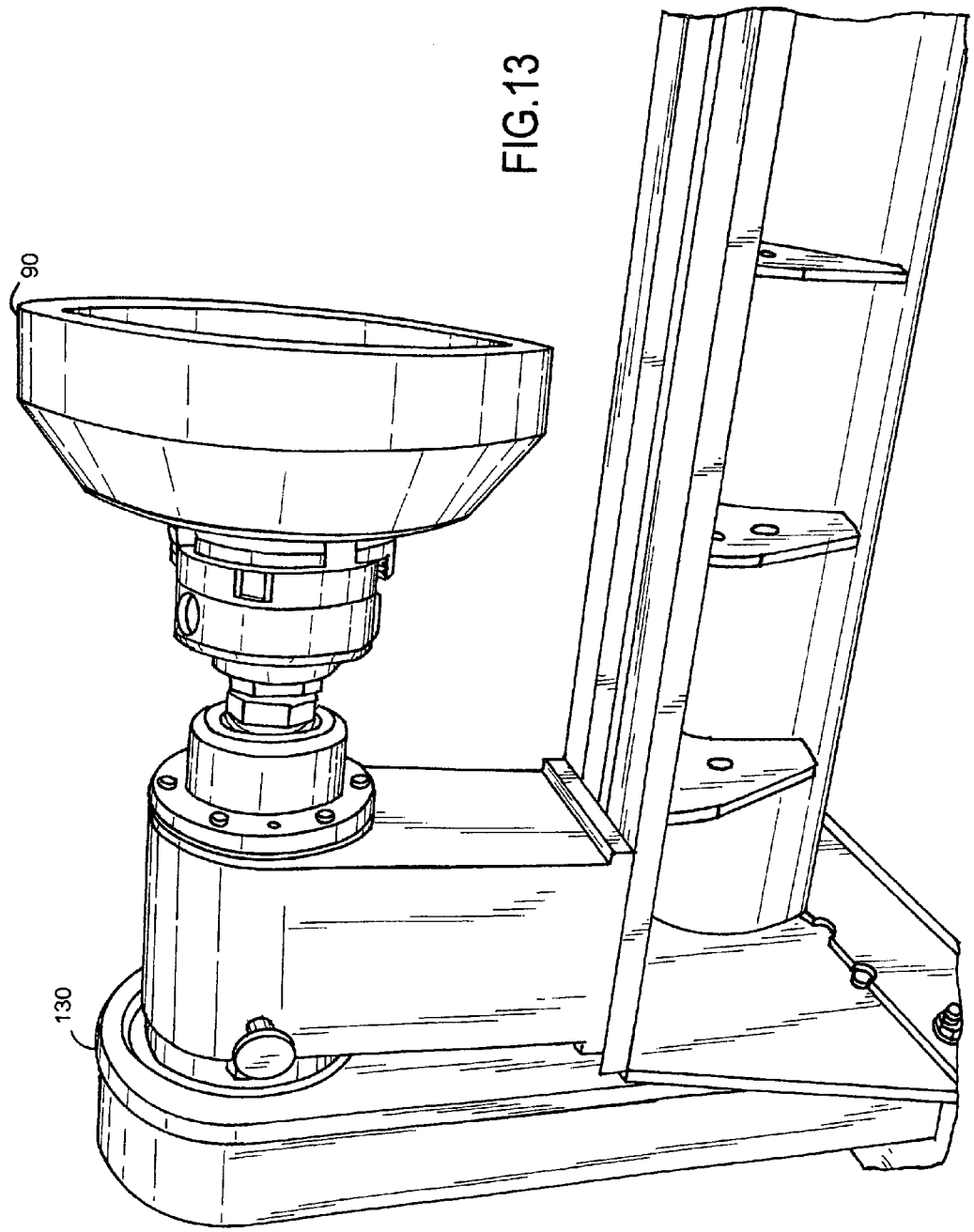
FIG. 13 is a perspective view of a typical bench mounted lathe and headstock with chuck and workpiece bowl, for example, attached to the chuck.
Figure 14:
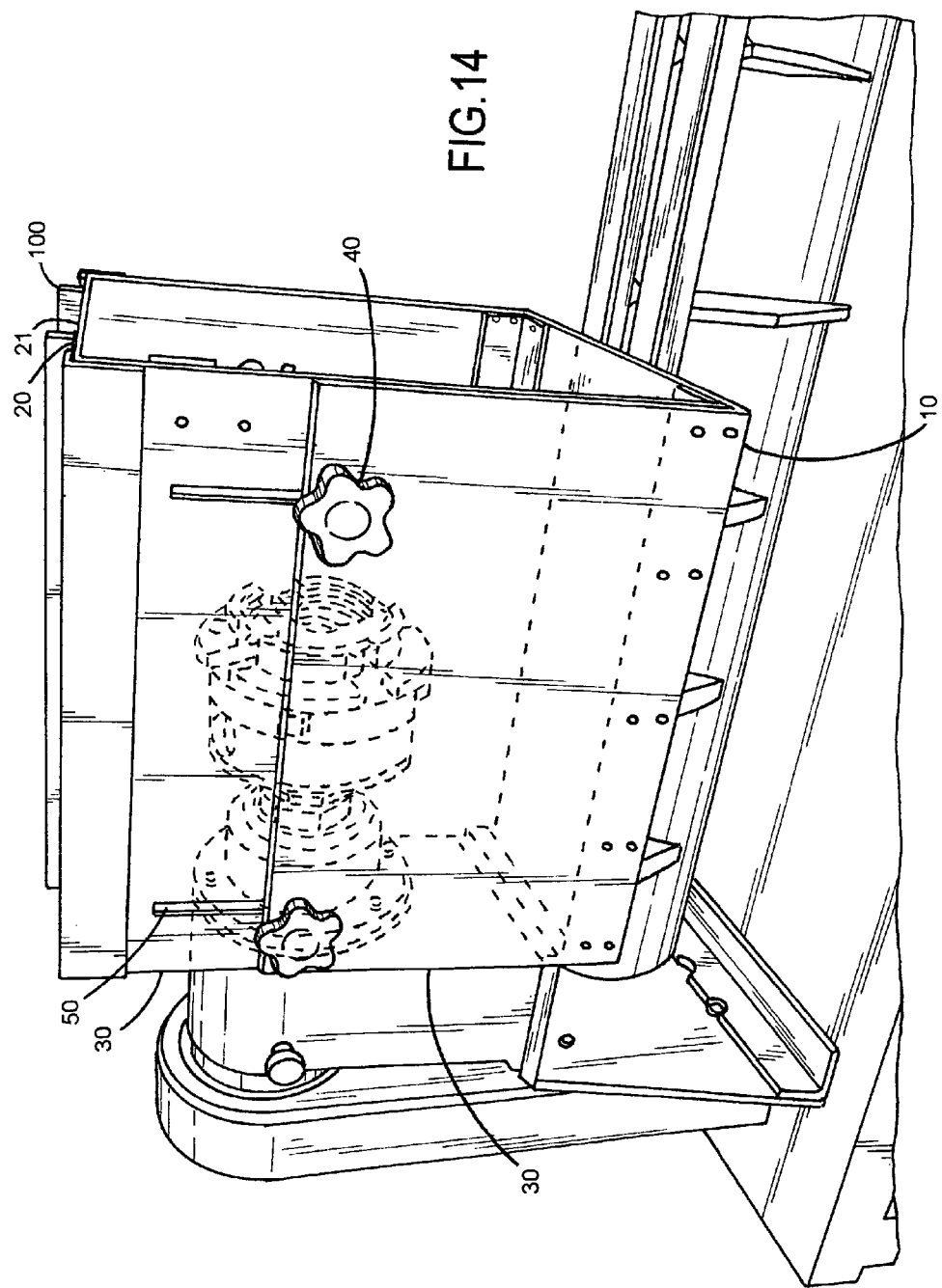
FIG. 14 is a perspective view of a typical bench mounted lathe and headstock with chuck attached (in hidden view) with a version of the device on the lathe bedway.
Figure 15:
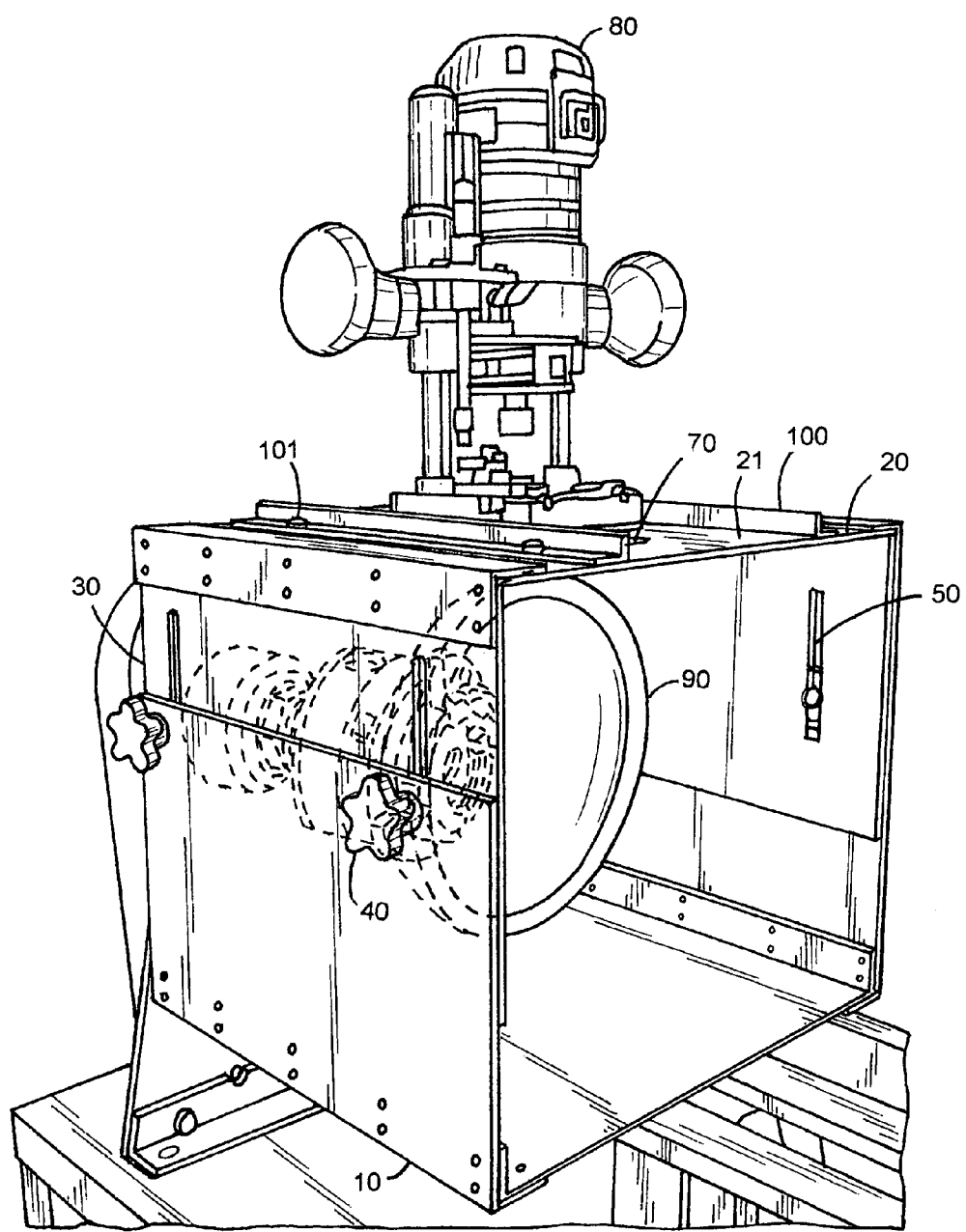
FIG. 15 is a perspective view of a typical bench mounted lathe and headstock with chuck and workpiece bowl, for example, attached (in partial hidden view) with a version of the device on the lathe bedway and hand tool router, for example, on the jig between the fences.
Figure 16:
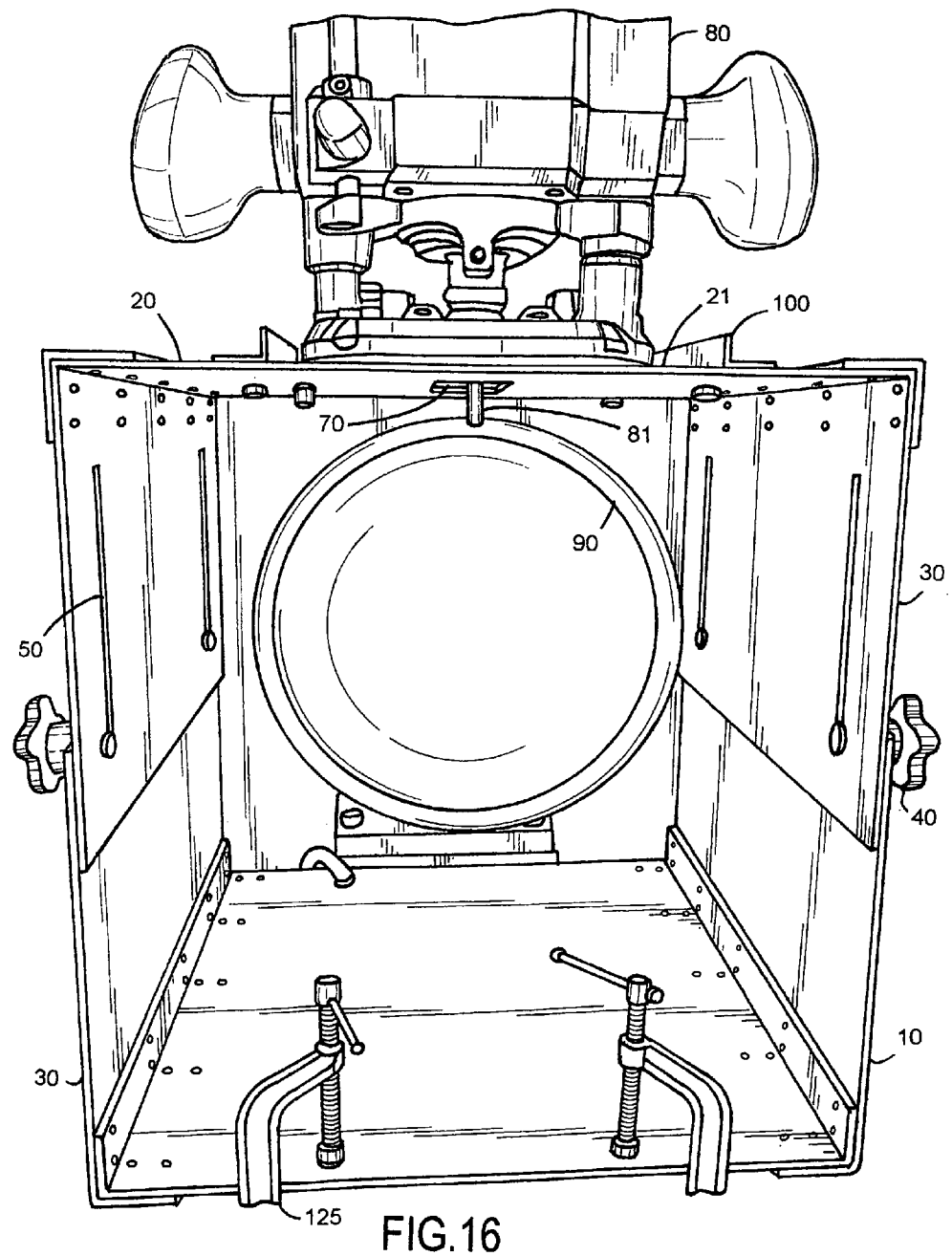
FIG. 16 is an end view of a version of the device on the lathe bedway with workpiece bowl, for example, and hand tool router, for example, on the device between the fences with tool bit through the center slot.
Figure 17:
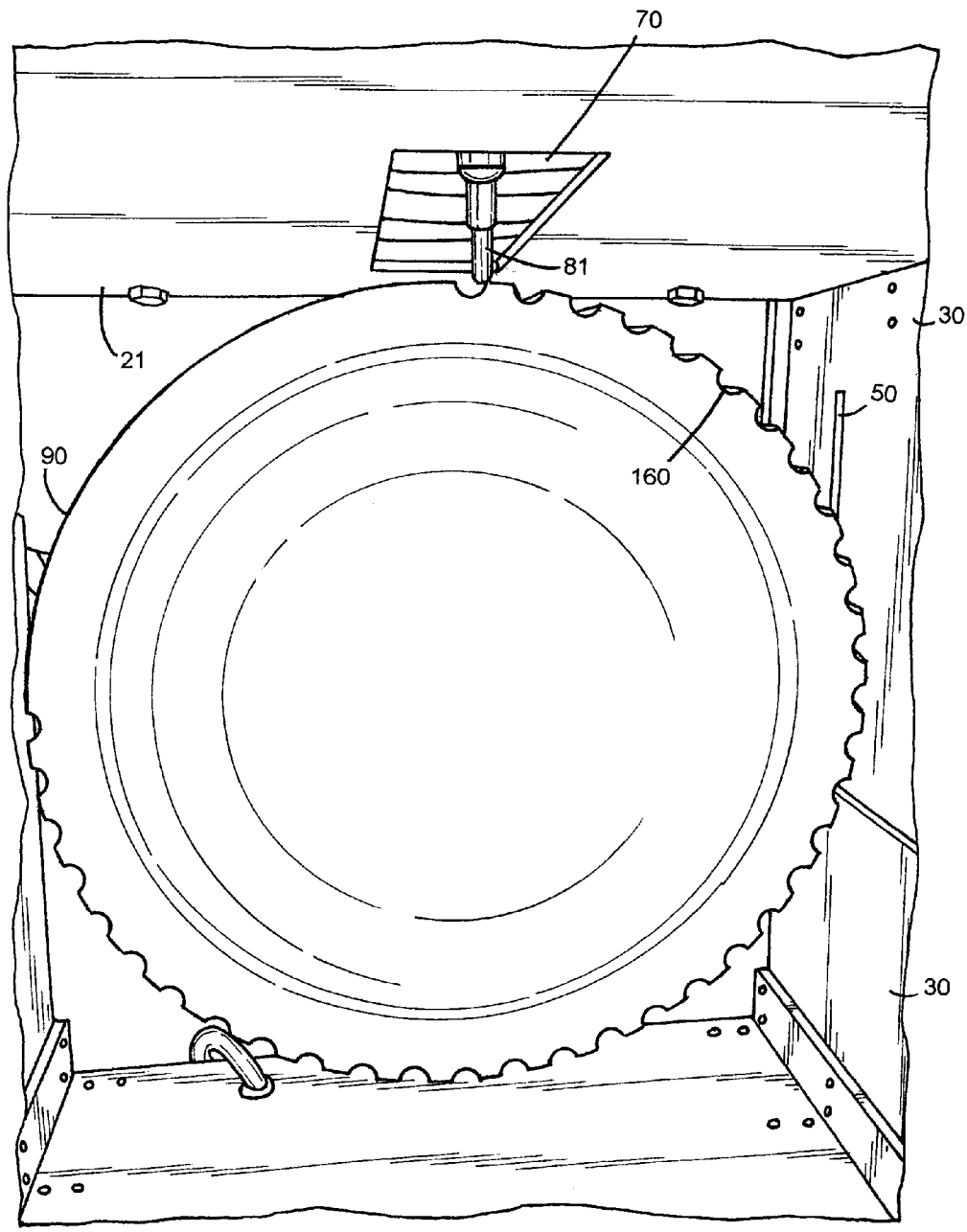
FIG. 17 is an end view detail of a version of the device on the lathe bedway with workpiece bowl, for example, and hand tool router, for example, on the device between the fences with tool bit through the center slot depicting a flute design effected on the workpiece by the operator.
Figure 18:
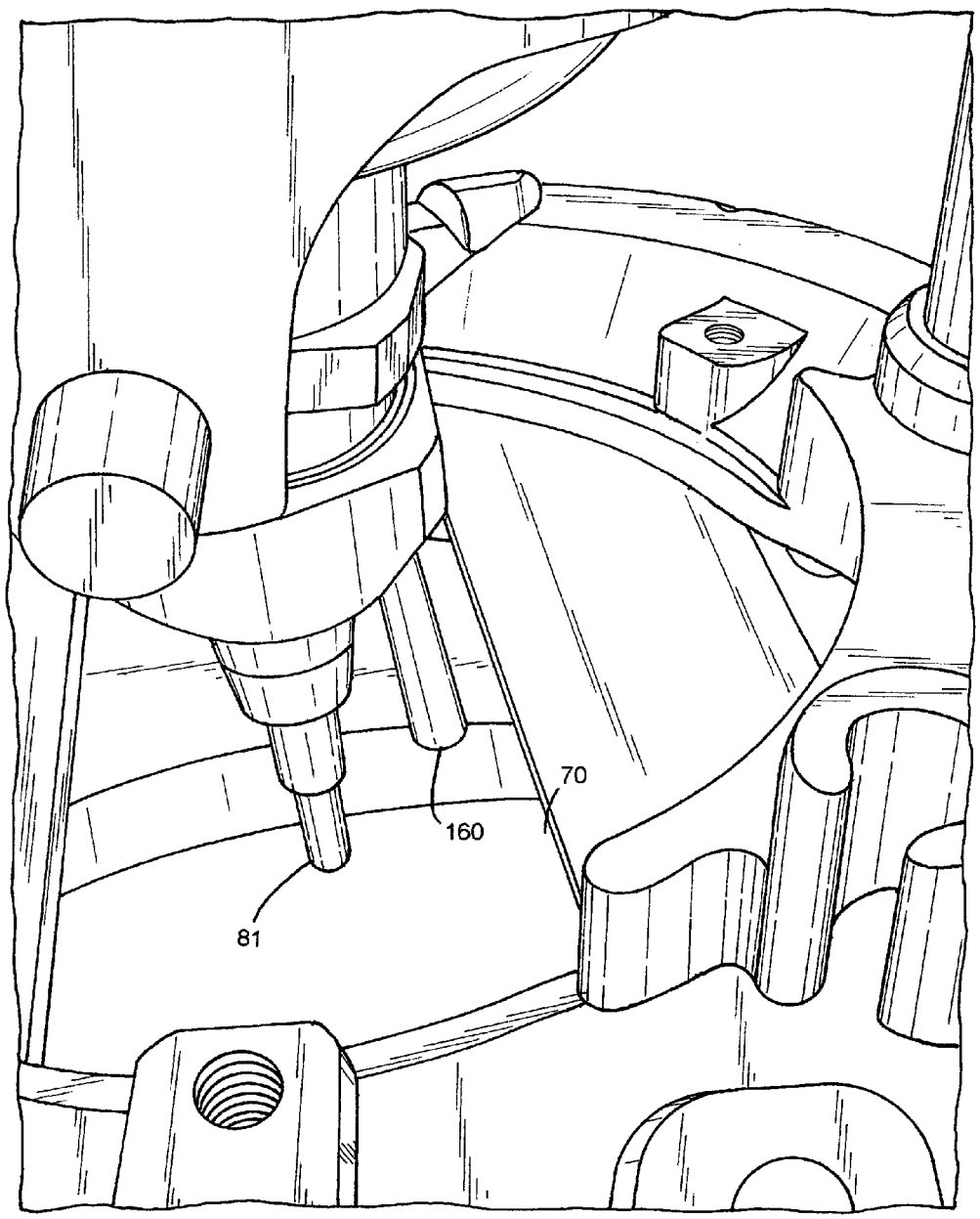
FIG. 18 is a top angle view detail of a version of the device on the lathe bedway with workpiece bowl, for example, and hand tool router, for example, on the jig between the fences with tool bit through the center slot depicting a flute design effected on the workpiece by the operator.

The opened ended box may be secured and/or releasbly attached to the bedways of the lathe 130 with the open ends of the device along the axis of the bedways with clamps, for example, or the device may be unattached to the lathe 130 if desired. The device is reversible, using either end, to get positive or negative angles (angle mode) as desired, as shown in FIGS. 5, 6, 7 and 8. Or the top unit 20 may be raised or lowered level (level height mode, either reduced or increased height) as shown in FIGS. 9 and 10.

A desired size center slot 70 is cut out in the center of the top plate 21 along the axis of the bedways. This allows the bit 81 of the router 80 (or other hand tool) to protrude through the top plate 21 and make contact with the workpiece 90 that the flute or design 160 is to be cut into, such as a bowl, as shown in FIGS. 15, 16, 17 and 18 as examples. The base of the router 80 slides along the top plate 21 with the router 80 or other hand tool bit 81 protruding through the center slot 70, also as shown in FIGS. 15, 16, 17 and 18 as examples.

The router 80 is guided along the device by two (optionally, only one) aluminum angle bar fence(s) 100. Each angle bar fence 100 is of a desired height, length and thickness, suitable for the intended purpose and is secured to the top plate 21 parallel to the axis of the lathe 130 bedways by machine screws and nuts (or other suitable connector 101). The screws pass through a hole 31 in one side of the angle bar fence 100 and then thru a fence slot 51 in the top plate. The fence slot 51 is cut perpendicular to the bedways so that the fence 100 can be adjusted to accommodate the dimensions of the base of whatever router 80 (or other hand tool) is used.

Optionally, an aluminum angle, for instance, stop plate 22 in the front and the back of the top plate (or vice versa) is secured to the top plate 21 by machine screws or other connector 101. The stop plate 22 has a stop plate slot 120 in it parallel to the bedways of the lathe 130 to allow it to be set in any position to control and limit the path of the router 80 (or other hand tool). A curved fence may be used to effect a curve design into the workpiece 90 if desired.

The primary requirements for successful use of versions of the invention are the design parameters set by the lathe equipment manufacturer. These requirements may vary from one particular lathe equipment manufacturer to another. Versions of the invention may be used with other hand tools (wood burner, saw, drill, etc.) to allow one skilled in the art to obtain different effects on the workpiece. A typical table mounted lathe 130 suitable for use with versions of the device is shown in FIGS. 11, 12, 13, 14, 15, 16 17 and 18.

As shown in FIGS. 12, 14, 15, 16, 17 and 18, to use the invention in this embodiment, one skilled in the art would place a version of the device to the bedways of the lathe 130 with the center slot 70 in the top plate 21 parallel to the bedways. A router 80, for example, is positioned on the top plate 21 with its bit 81 protruding thru the center slot 70. The router 80 can be a fixed or plunge type of virtually any size or brand. Any router bit 81 can be used to create the design on the stationary workpiece 90 that the user desires.

The workpiece 90 (such as a bowl, plate, platter, spindle, as examples) is mounted on the lathe 130 using a chuck, faceplate or any other method supported by the lathe. The workpiece 90 can be mounted on the headstock alone or between the headstock and tail stock. The device may be releasbly attached to the lathe 130 with a clamp(s) 125 if desired. The device may also may be permanently attached to the lathe 130 via welding or other permanent means if desired.

The index feature (well known in the art) on the lathe 130 is used to assure evenly placed designs 160 on the workpiece 90. As the router 80 is drawn along the top plate 21 of the device it routs the design 160 into the workpiece 90. The router 80 is guided along the top plate 21 by the guide angle bar fence(s) 100. The fence(s) 100 can be straight to create designs 160 parallel to the lathe 130 bedways or curved to create curved designs. The optional angle stop plate(s) 22 can be used to secure the router 80 in place so that if a plunge router is used rosette type designs can be created in the workpiece 90.

As each design 160 is routed into the workpiece 90 the headstock is indexed to the next desired position, well known to one skilled in the art, in precise angles from zero degrees to 360 radial degrees. This allows any number of precisely and/or symmetrically placed designs 160 such as flutes, rosettes, scallops to be routed into the workpiece 90. The design 160 can be placed on the surface of the workpiece 90 or can be cut all the way through the workpiece 90.

The device can be mounted on the lathe 130 with the center slot 70 parallel to the lathe 130 bedways to create designs such as flutes parallel to the bedways. The device can also be rotated on so that it is at an angle to the bedways in order to create designs 160 on the workpiece 90 at the corresponding angle to the bedways.

The top plate 21 of the device can be adjusted at an angle, either positive or negative, to the bottom unit 10 by using the slots 50 in the legs 30 of the top plate 21. This allows the creation of designs 160 on workpieces 90 that have angled or irregular sides. The device can be mounted in either direction (front, back or vice versa) on the longitudinal axis of lathe 130 so that that all its features can be utilized in either direction. The device will work with virtually any lathe 130 and any router 80. The workpiece 90 can be made of wood or any other material that can be mounted on a lathe 130 and cut with router bits 81. Other hand tools and bits may also be used.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function(s), instruction(s), component(s), application(s), interaction(s), item(s), product(s), good(s), group(s) and sub-group (s) as might be desirable or useful to someone skilled in the art.

As will be apparent to persons skilled in the art, such as a person in the lathe industry, wood or metal worker, lathe and/or jig designer, jig manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. An article of manufacture, a portable lathe jig device, comprising:
   a bottom unit comprising a base plate of a desired width, height and thickness, and;
   two bottom vertical legs of a desired width, height and thickness attached to the base plate to form a U-shape, and;
   two apertures of a desired size integrated into each bottom vertical leg, and;
   further comprising a top unit further comprising a top plate of desired width, height and thickness, and; two top vertical legs of a desired width, height and thickness attached to the top plate to form a U-shape, and; two leg slots of a desired size integrated into each top vertical leg, and; further comprising a center slot disposed on the top plate, and;
   further comprising a fence attached on both sides of the center slot and;
   further comprising a stop plate attached on the front and the back of the center slot, wherein the bottom unit and top unit are slidably engaged with each other, and;
   further comprising knobs with threaded tightening bolts inserted though the two apertures of each bottom vertical leg and each leg slot of the two top vertical legs such that the slidably engaged top unit and bottom unit may be tightened or loosened to restrict or allow movement between the top unit and the bottom unit via the knobs with threaded tightening bolts.

2. The device of claim 1 further comprising movable fences adjustable for different widths relative to the center slot disposed on the top plate.

3. The device of claim 1 further comprising movable stop plates adjustable for different lengths relative to the center slot disposed on the top plate.

4. The device of claim 1 made of suitable metal.

5. The device of claim 1 made of suitable wood.

6. The device of claim 1 made of suitable plastic.

7. The device of claim 1 further comprising the device releasably attached to a bed of a lathe.

8. The device of claim 1 further comprising the device permanently attached to a bed of a lathe.

9. The device of claim 1 further comprising the device locked in angle mode.

10. The device of claim 1 further comprising the device locked in level height mode.

11. The device of claim 1 wherein the knobs with threaded tightening bolts may be any other suitable connector.

12. An article of manufacture, a portable lathe jig device, comprising:
    a bottom unit comprising a base plate of a desired width, height and thickness, and;
    two bottom vertical legs of a desired width, height and thickness attached to the base plate to form a U-shape, and;
    two apertures of a desired size integrated into each bottom vertical leg, and;
    further comprising a top unit further comprising a top plate of desired width, height and thickness, and; two top vertical legs of a desired width, height and thickness attached to the top plate to form a U-shape, and; two leg slots of a desired size integrated into each top vertical leg, and; further comprising a center slot disposed on the top plate, and;
    further comprising a fence attached on both sides of the center slot and;
    wherein the bottom unit and top unit are slidably engaged with each other, and;
    further comprising suitable connectors inserted though the two apertures of each bottom vertical leg and each leg slot of the two top vertical legs such that the slidably engaged top unit and bottom unit may be tightened or loosened to restrict or allow movement between the top unit and the bottom unit via the suitable connectors.

13. The device of claim 12 further comprising movable fences adjustable for different widths relative to the center slot disposed on the top plate.

14. The device of claim 12 made of suitable metal.

15. The device of claim 12 made of suitable wood.

16. The device of claim 12 made of suitable plastic.

17. The device of claim 12 further comprising the device releasably attached to a bed of a lathe.

18. The device of claim 12 further comprising the device permanently attached to a bed of a lathe.

19. The device of claim 12 further comprising the device locked in angle mode.

20. The device of claim 12 further comprising the device locked in level height mode.

* * * * *